Dec. 14, 1937.   C. E. PARKER   2,102,482

BURNER MECHANISM FOR GASEOUS FUEL STOVES

Filed Aug. 7, 1936   3 Sheets-Sheet 1

Inventor
Claude E. Parker
By
Parker, Carlson, Pitzner & Hubbard
Attorneys

Inventor
Claude E. Parker
Attorneys

Dec. 14, 1937.                  C. E. PARKER                    2,102,482
                    BURNER MECHANISM FOR GASEOUS FUEL STOVES
                   Filed Aug. 7, 1936              3 Sheets-Sheet 3
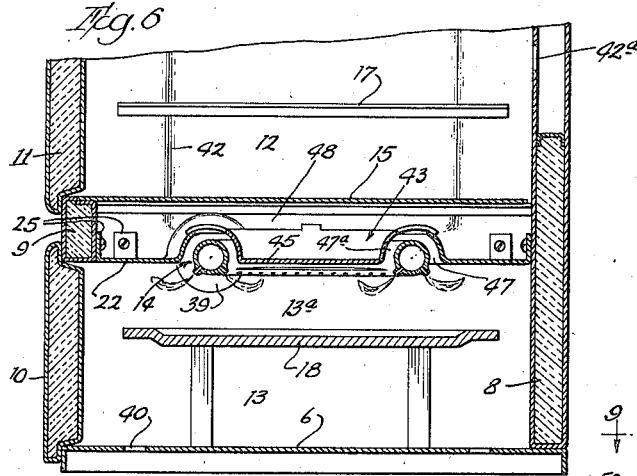
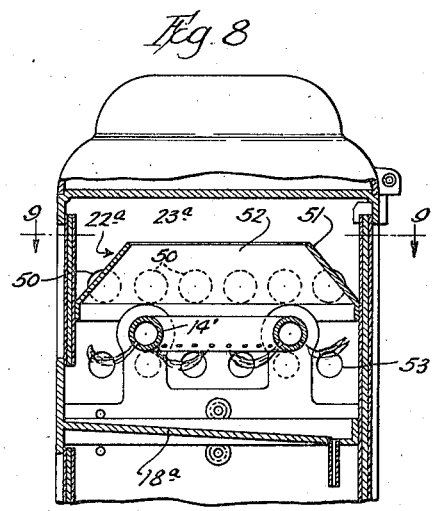
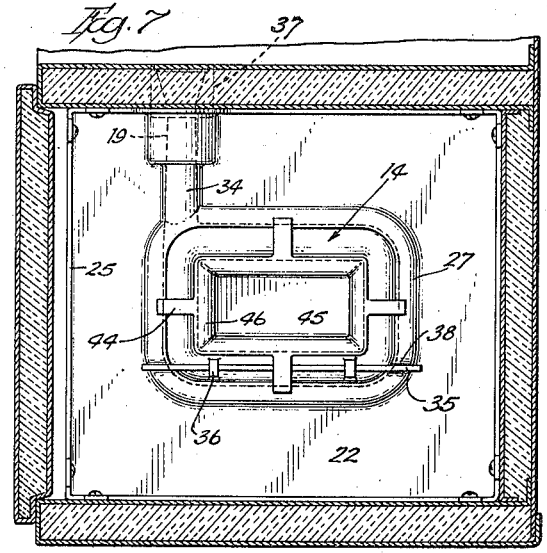
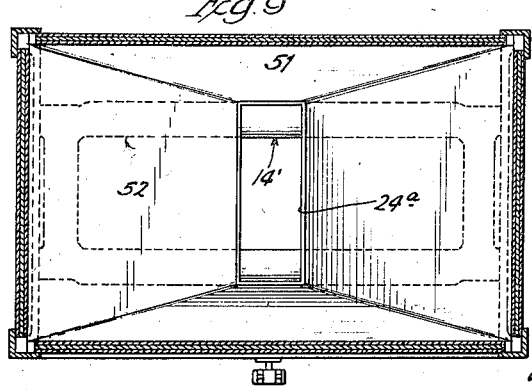
Inventor:
Claude E. Parker
By
Parker, Carlson, Pitzner & Matthews
Attorneys Patented Dec. 14, 1937

2,102,482

UNITED STATES PATENT OFFICE 2,102,482

BURNER MECHANISM FOR GASEOUS FUEL STOVES

Claude E. Parker, Chicago, Ill., assignor to Skoop-A Corporation, Chicago, Ill., a corporation of Illinois Application August 7, 1936, Serial No. 94,825

8 Claims. (Cl. 126—41)

The invention pertains to a burner mechanism for gaseous fuel stoves, and has for its general object a substantial increase in thermal efficiency as compared with prior stoves, coupled with an improved utilization of the heat of combustion.

A further object of my invention is to provide a gaseous fuel stove adapted for use in a room or other space intended for human occupancy, and comprising an enclosure and an improved burner mechanism therein operative to insure complete consumption of all combustible particles introduced into the enclosure, thereby permitting the elimination of the usual flue pipe without any accompanying discharge of objectional odorous gases into the room.

My invention concerns particularly a burner mechanism for gaseous fuel cook stoves, and in this connection another object is to effect an improved application of heat for broiling purposes whereby to produce a more rapid and effectual penetration of the food products, with a more uniform cooking thereof, to preserve to a large extent the natural juices and flavor of the food, and insure complete combustion not only of the fuel supplied to the burner, but also of all combustible particles and vapors or distillates arising from the food in the process of cooking, to the end that smoke and objectionable odors are effectually eliminated before the spent gases are ultimately discharged from the stove.

A further object is to provide a burner mechanism operative to effect a storage of heat in the burner compartment for a long period of time after the burner is turned off, whereby to continue the application of heat to a superimposed baking oven.

My improved burner mechanism comprises briefly a gaseous fuel burner of ordinary character supported in a suitable enclosure, such as the broiling compartment of a gas range, with the jet orifices of the burner discharging laterally and preferably somewhat downward in the compartment. Further, it includes means for retarding substantially the passage of hot gases through the compartment as contradistinguished from the practice long in common use of permitting or inducing a relatively free and rapid draft of such gases through the compartment. Finally the arrangement is such that all combustibles entering the combustion chamber below the burner are compelled before escaping from the compartment to pass with a retarded flow through a highly heated region in which the heat of the burner is concentrated, so as to insure complete oxidization or consumption of such combustibles.

It being understood that my invention, in its broader aspects, resides in the general combination of means cooperating to attain the objects above generally set forth, I have herein shown it applied by way of illustration to the broiler compartment of a gaseous fuel cook stove.

Referring now to the accompanying drawings:

Figs. 6 and 7 are views similar to Figs. 1 and 3 respectively, but showing another modification.

Fig. 8 is a vertical sectional view of another form of stove structure.

Fig. 9 is a horizontal section taken in the plane of line 9—9 of Fig. 8.

Figure 1:
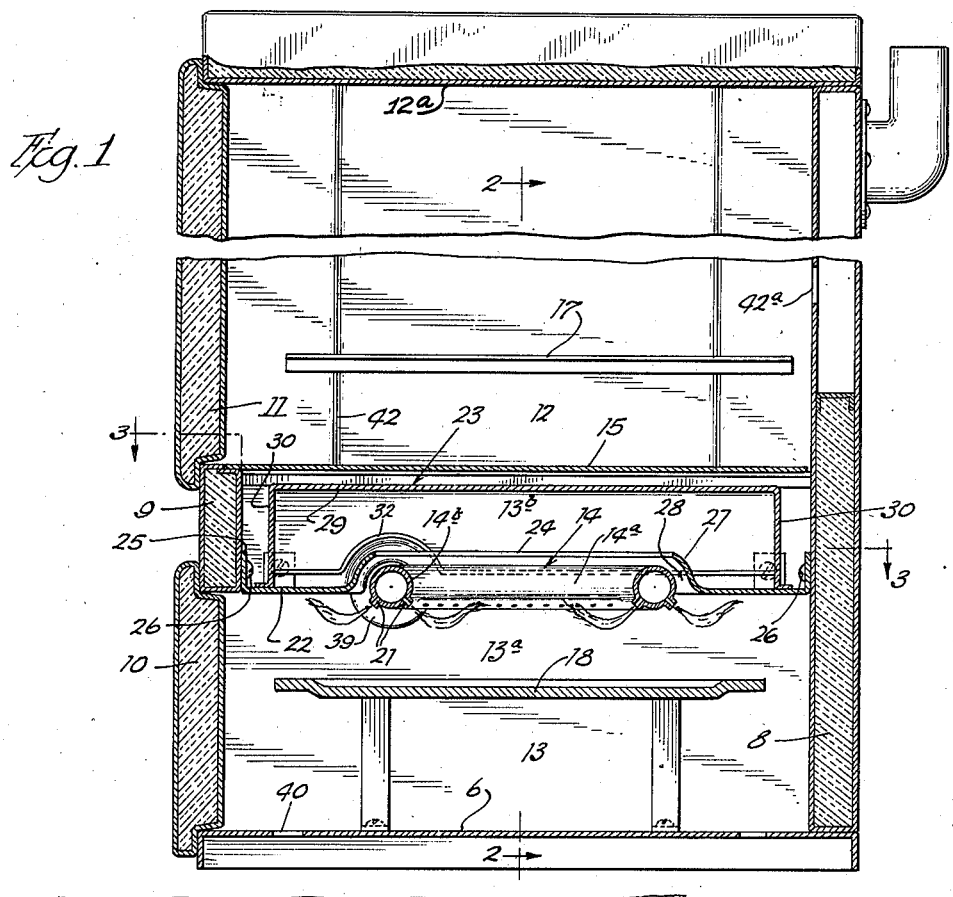
Figure 1 is a fragmentary vertical sectional view through a stove structure, taken in a plane extending in a front to rear direction centrally through the oven compartment of a gaseous fuel stove.

In the instant embodiment, the improved stove comprises generally an oven structure having a bottom wall 6, upright side walls 7, a rear wall 8, and a front wall 9 with suitable openings adapted to be closed by doors 10 and 11 and respectively providing entry into an upper or baking compartment 12 and a lower or broiling compartment 13. In the upper portion of the broiling compartment and between the openings closed by the doors 10 and 11 is disposed the burner mechanism, comprising a gaseous fuel burner 14 and a baffle structure associated with the burner and cooperating therewith to effect the complete consumption or oxidation of all combustibles entering the space below the burner. Above the burner mechanism is a partition wall 15 defining the top of the lower or broiling compartment and the bottom of the upper or baking compartment. It will of course be understood that the baking oven 12 has the usual top wall 12ª and is equipped with suitable rack supports 17. Within the combustion chamber spaced a short distance below the burner is a food supporting plate 18 which may be supported in any suitable or well known manner.

The burner 14 is shown in the present instance as being rectangular in form and is of ordinary construction. It has the usual tubular extension 19 formed at its outer end with a mixing bell 20 adapted to receive a supply of gaseous fuel and primary air in the ordinary way. The burner proper is provided with jet orifices 21 discharging laterally and in this instance somewhat downwardly in opposite directions from both sides of the burner with a primary combustion chamber 13ª formed between the burner and the plate 18. Preferably the burner is disposed substantially centrally in the upper portion of the compartment 13.

Figure 2:
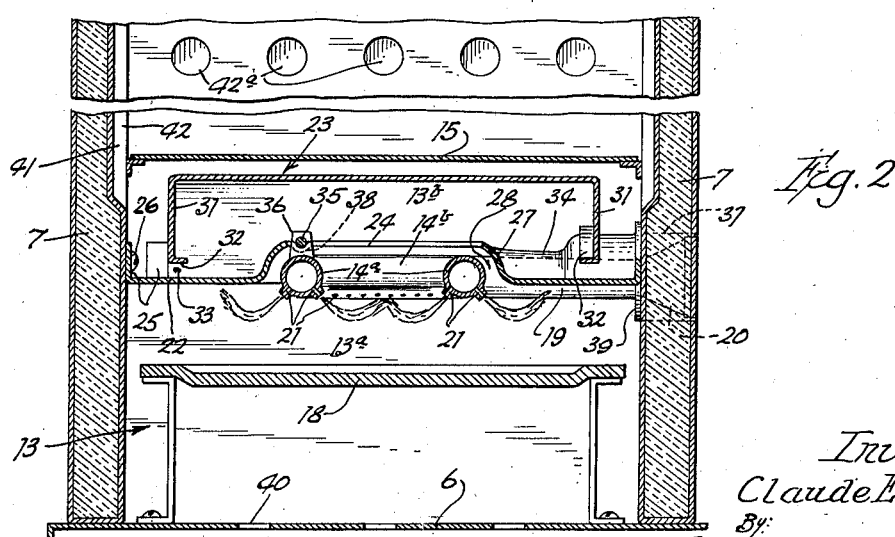
Fig. 2 is a similar view taken approximately in the plane of line 2—2 of Fig. 1.
Figure 3:
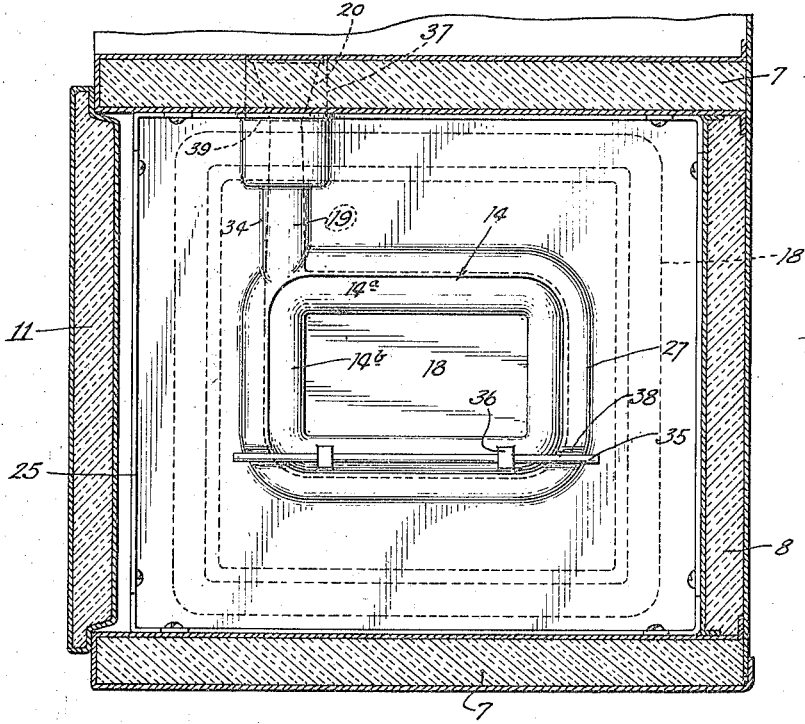
Fig. 3 is a horizontal plan section taken approximately in the plane of line 3—3 of Fig. 1.

The baffle structure associated with the burner 14 comprises, in this preferred embodiment shown in Figs. 1 to 3, a horizontal partition 22 and a superimposed dome 23. The latter forms an oxidizing or secondary combustion chamber 13ᵇ which communicates with the lower or primary combustion chamber 13ª only through a central opening 24 in the partition 22, of a size somewhat less than the external dimensions of the burner. The partition is formed from a flat sheet of metal but may be made of any other suitable heat reflecting and radiating material supported approximately in the plane of the burner, slightly above the jet orifices 21, and has upstanding edge flanges 25 tightly secured as by means of bolts 26 to the side walls 7 and rear and front walls 8 and 9.

It will be observed that the partition 22 constitutes in effect a top wall for the lower combustion chamber 13ª and completely closes the compartment transversely thereof except for the opening 24. By locating the partition above the opening for the door 10 it is possible to maintain an adequate seal between the partition and the front wall of the compartment, it being seen that if the partition were located within the area of the door opening, the maintenance of the close fitting relation would be difficult if not impossible.

Preferably the opening 24 is formed in a central raised portion rising upwardly from the main body of the partition adjacent the outer side portions of the burner, and partially overlying the burner in spaced relation thereto. By this construction, the partition includes an inwardly and upwardly projecting central deflecting annulus 27 coacting with the outer sides of the burner members 14ª and 14ᵇ to form a relatively narrow passage 28 around the burner and serving to direct the hot upwardly flowing gases toward the center of the dome.

The dome 23 of the baffle structure is preferably arranged to extend laterally above the burner and may be made of sheet metal. It has a top wall 29, front and rear walls 30 and side walls 31. As shown the dome forms a wide chamber having a top wall spaced a short distance above the baffle and its vertical walls spaced a short distance from the inner side faces of the upright walls of the stove structure. The front and rear walls 30 are provided at their lower edges with out-turned flanges resting upon the partition 22 in spaced relation to the rear and front walls 8 and 9. The side walls 31 (Fig. 2) terminate short of the partition 22 but below the plane of the opening 24 in the annulus 27. Herein the side walls 31 are shown as formed with inturned flanges 32 forming with the partition slots 33 for the escape of products of combustion from the dome, said slots being relatively narrow as compared to the vertical depth of the dome.

One of the side walls 31 of the dome has a downwardly opening semi-circular notch therein for receiving the outer end portion of an inverted channel 34 formed in the partition 22 to accommodate the tubular supply member 19 of the burner. The notched wall 31 thus fits tightly over the inverted channel portion 34 of the partition so as to prevent the escape of hot gases from the dome except through the slots 33.

The burner 14 may be conveniently supported in part by the partition 22 through the medium of a rod 35 entered through upstanding lugs 36 integral with the leg 14ª of the burner on the side opposite the tubular supply member 19; and in part by the tubular member 19 engaging in a suitable opening 37 in the adjacent side wall 7 of the stove structure. The rod 35 projects beyond the ends of the burner (Fig. 3) and rests in grooves 38 formed in the annulus 27. To prevent the escape of gases through the opening 37 the tubular member 19 may be formed with a flange 39 engaging with the inner side of the adjacent wall 7 at the inner peripheral edge of the opening 37.

In the present instance, secondary air is supplied to the primary combustion chamber 13ª through the space surrounding the plate 18. This air is admitted to the burner compartment by a plurality of holes 40 in the bottom wall 6. To exhaust waste or spent gases from the space surrounding the dome 23, the side wall 7 may be formed with narrow elongated passages 41 on opposite sides of the bottom plate 15 of the baking oven 12, the inner side faces of said side walls being outwardly recessed as indicated at 42 for this purpose. Said passages open into the baking oven and the latter has one or more outlet openings 42ª in the rear side wall 8.

As previously indicated, a feature of my invention of primary importance is the retardation of the flow of gases through the compartment 13. In the construction above described such retardation or delayed passage of the gases is attained primarily by the burner mechanism and particularly by the baffle structure in cooperation with the burner 14. In this connection, it will be seen that the oppositely disposed slots 33 provide a restricted outlet from the dome 23, these slots being in the illustrative embodiment approximately one-half inch wide in the case of a dome approximately three and one-half inches deep from the top wall 29 thereof to the partition 22, and of transverse dimensions approximately fourteen and one-half inches by seventeen inches. In practice the size of the outlet formed by the slots is proportioned so as to permit the escape of the hot gases from the dome and hence the gases passing through the broiler compartment, at a rate such as to insure the supply of secondary air to the burner in an amount required to support complete combustion. In proportioning the slots 33 suitable allowance is of course made for the admission of primary air and fuel, and for natural expansion, so as to avoid smothering of the flame of the burner.

While the flow of gases through the compartment is restricted by the baffle structure, the secondary air supply openings are also preferably restricted substantially to that required to support complete combustion when the burner is in full operation, the inlet holes 40 in the bottom 6 being in the present instance properly proportioned to effect this result. Such restriction of the secondary air inlet contributes to the delayed or retarded passage of gases through the compartment and retards cooling thereof after the burner is turned off.

The broiler plate 18 is preferably of relatively heavy cast material imperforate and of lateral dimensions substantially greater than the burner. In practice, this plate is supported a short distance below the burner and constitutes not only a supporting surface for food particles to be broiled but serves to form a bottom wall for the primary combustion chamber 13$^a$, thus assisting in maintaining this chamber at an extremely high temperature. It will be evident that the discharge of gaseous fuel into this high temperature zone materially promotes combustion of the fuel. As a further aid to maintaining the chamber 13$^a$ at high temperature, the heat within the dome is reflected downwardly through the opening 24, the top wall of the dome serving as a heat reflecting baffle.

The combustible vapors, distillates, and other particles arising from the food being cooked, mix with the hot gases of combustion in the aforesaid high temperature zone. The gases then rise into the dome where they are trapped temporarily before passing gradually outwardly and downwardly to the outlet formed by the slots 33. The dome thus defines a second region of extremely high temperature immediately above the burner, forming in effect an auxiliary combustion or oxidizing chamber in which any combustible particles not already consumed are ultimately consumed in the gradual passage of the gases to the outlet slots 33.

It will be observed that the burner is arranged so as to effect a uniform distribution of heat to the cooking plate, being herein located substantially centrally of the burner compartment 13 with its side portions or legs 14$^a$ and 14$^b$ spaced inwardly from the upright side walls of the compartment so as to avoid impingement upon the latter by the burner flames. Also the dome has a lower inlet opening disposed above the burner orifices and extends laterally from said opening, with the outlet slots 33 disposed a substantial distance to one side of the burner. Accordingly, after entering the dome the upward traveling gases strike the top wall thereof and are then deflected thereby laterally and downwardly with the result that the gases become intimately mixed before their discharge through the outlet slots 33.

Since the region of highest temperature in the dome is immediately above the burner, centrally thereof, it is desirable for best results that the gases be compelled to pass through this region. This is insured in the present instance by the centrally apertured partition 22 and the deflecting annulus 27. For best results the outlet slots 33 are located substantially below the top of the dome in a plane above the jet orifices 21 but below the central opening 24 in the annulus 27. The location of the slots above the plane of the burner orifices prevents the creation of a pressure area in a plane below the orifices and thus avoids smothering of the flame. On the other hand, the location below the plane of the opening 24 insures the circulation of hot gases first upwardly centrally of the dome and thence laterally and downwardly before escaping through the space surrounding the dome.

In the initial operation of the stove, the gases incident to combustion pass rapidly upward through the primary combustion chamber 13$^a$ and into the upper chamber 13$^b$ where they are trapped or temporarily confined before discharging through the restricted outlets 33 at opposite sides of the chamber. Due to the slow and gradual escape of the gases from this upper chamber, the latter soon becomes so filled with hot gases as to slow up substantially the rate of upward movement of the gases from the lower chamber, until finally, as the operation continues, the ascent of the gases in the lower chamber is retarded to an extent corresponding to the rate of escape of waste gases from the upper chamber. Thus there is formed in the region containing the burner a high temperature combustion zone through which a body of highly heated gases ascends slowly in passing through the opening in the partition 22 into the upper chamber.

It will be observed that because of the slow upward movement of the gases through the enclosure, the time during which the products of combustion and volatile products arising from the food being cooked are subjected to the intense heat of said combustion zone, is substantially prolonged so that the combustible products are more effectually consumed. Also the heat of said slowly ascending body of gases is radiated downwardly onto the cooking plate, effectually penetrating the food thereon to such a degree that it has been found unnecessary in broiling thick steaks, for example, to turn the latter.

Contributing to the consumption of the combustible particles and to the more effectual application of heat to the food is the partition member 22, which being interposed in the path of the rising gases is subjected to a scrubbing action by the gases in passing to the central opening for escape to the upper chamber. Accordingly, this partition becomes heated to an extremely high temperature and as will be evident, any combustible particles impinging thereon are instantly consumed. At the same time, the baffle constitutes a reflector, radiating heat downwardly toward the heating plate, thus further assisting in the maintenance of the region containing the burner at a high temperature.

After passing through the baffle into the upper chamber, the hot gases strike the top wall 29 of the chamber or dome, and are then deflected downwardly and outwardly, becoming thoroughly commingled while still in a highly heated state before passage to the outlet openings 33. Important in this connection is the location of the top wall 29 a short distance above the partition so that the dissipation of heat in an upward direction is prevented and the region immediately below maintained at a high temperature. Moreover, in passing to the outlets 33, the hot gases pass laterally over the highly heated partition 22. Thus the upper chamber is also maintained at a high temperature, and in the slow passage of the gases to the outlets, any combustible particles which have not been consumed in the primary combustion chamber, are completely consumed or oxidized before escaping from the enclosure.

Because of the delayed or retarded passage of gases through the lower or broiler compartment, the burner flames have been found to project downwardly and laterally to a much greater degree than is true where a free and rapid upward draft of gases is permitted or induced. In the present construction, the side members 14$^a$ of the burner are spaced apart approximately four inches, and the end members 14$^b$ approximately seven and one-half inches, while the passage 28 between the sides of the burner and the annulus 27 is of a width approximately one-half inch.

With the parts thus proportioned, the elongated flames substantially overlap and form in effect a continuous sheet of flame as shown in Fig. 2. Thus all combustibles introduced into the combustion chamber 13ª are compelled in escaping from this chamber to pass upwardly through the flames of the burner, thus further insuring complete oxidation.

Experience has shown that by thus controlling the gaseous products in their passage through the burner compartment or enclosure, a high degree of thermal efficiency is obtainable. At the same time, it is possible to broil food products much more quickly than in prior structures and much more effectually and with substantially less shrinkage and greater uniformity. Moreover, the natural juices and flavors of the food are to a large extent preserved, and so effectual is the application of the heat that in broiling meats, for example, no turning thereof is necessary. Indicative of the complete combustion effected is the demonstrated fact that a large quantity of food may be completely consumed in a prolonged subjection to the heat of the burner, and this without producing any noticeable or objectionable odors in the room into which the final waste gases are permitted to discharge. Moreover, extensive tests have shown that the aforesaid desirable results are attained by the operation of the burner mechanism in restricting the flow of hot gases through the compartment to a rate substantially corresponding to the admission of secondary air in an amount sufficient only to support complete combustion when the burner is in full operation.

The retarded passage of the heated gases through the lower or broiler compartment and thence to the upper or baking compartment also effects an improved utilization of the heat of the burner in so far as the upper oven is concerned. This is due to the fact that the gases are not unnecessarily reduced in temperature by the admission of an excessive amount of secondary air, and attain an extremely high temperature in the dome before escaping to the upper compartment. Also, by avoiding the customary rapid draft of the gases through the compartment, the usual rapid dissipation of heat from the stove after the burner is turned off is avoided. In this connection, the restriction of the air inlet serves to reduce to a minimum the entry and circulation of cool air. Illustrative of this advantage is the fact that the burner may be turned off substantially in advance of the completion of a given cooking or baking operation which is completed by stored heat. Also food products may be kept hot for a long period of time.

Figure 4:
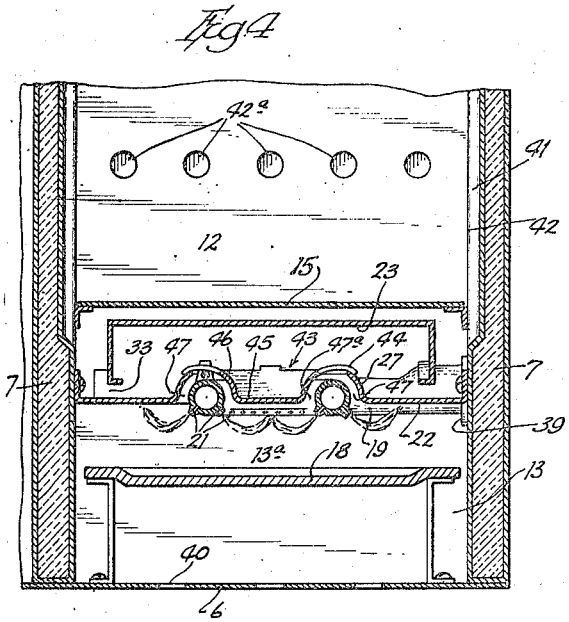
Fig. 4 is a fragmentary vertical sectional view similar to Fig. 2 but on a smaller scale and showing a modified form of the invention employing a central baffle member.
Figure 5:
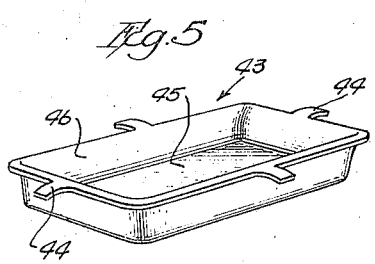
Fig. 5 is a perspective view on a larger scale of the central baffle member forming part of the burner mechanism in Fig. 4.

In Fig. 4, I have shown a modified form of baffle structure employing in addition to the dome 23 a central imperforate baffle member 43. In the present instance this baffle member is in the form of a rectangular pan having laterally extending lugs 44 adapted to rest upon the annulus 27 at the edge of the opening 24 and serving to provide a flat central plate 45, disposed substantially in the plane of the axis of the burner, and an inner annulus 46 having its outer edge spaced from the annulus 27 and coacting with the burner to form narrow passages 47 and 47ª. In the case of a structure having the proportions above set forth in connection with Figs. 1 to 3, said passages are preferably of a width approximately one-half inch. These passages thus provide a restricted outlet from the primary combustion chamber 13ª supplementing the retarding effect produced by the outlet slots 33 of the dome. In addition the construction insures that the gases in escaping from the chamber 13ª must pass upwardly through the flames of the burner in escaping from said chamber.

It will be seen that the central baffle member 43 constitutes a heat reflector cooperating with the partition 22 to direct the heat of the burner downwardly onto the solid cooking plate 18 which latter also serves as a reflector. This arrangement, together with the restriction of the secondary air supply and the retardation of the flow of the gases from the compartment, produces an extremely high temperature zone effectually cooking the food products and promoting combustion of the fuel and oxidization of combustible vapors rising from the food.

In Figs. 6 and 7 I have shown a baffle structure similar to that of Fig. 4, in combination with an overlying chamber 48 for trapping and temporarily confining the hot gases of combustion which ultimately escape laterally from opposite sides of the chamber through narrow outlet openings similar to the openings or slots 41 in Fig. 4 which are of a width somewhat narrower than the slots 33. As indicated by the recess 42 in Fig. 6, the slots are of a length substantially less than the corresponding side of the chamber 48.

It will be observed that the central baffle member 45 coacts with the partition 22 to retard the upward flow of gases through the narrow passages 47 and 47ª, and that the flow of gases through the enclosure is further retarded by the overlying chamber 48 with its laterally disposed relatively narrow outlet slots formed by the recesses 42. Upon entering the chamber 48, the gases impinge upon the partition plate 15 forming the top wall of the chamber and become intimately mixed or commingled before escaping laterally from the chamber beneath the top wall thereof. The partition member 22 together with its central baffle member 45 are subjected to the intense heat of the burner, and the overlying chamber 48 is maintained at an extremely high temperature so that any combustible particles not consumed in the lower combustion zone 13ª are subjected to the heat of the upper chamber for oxidation before escaping through the discharge outlets.

In Figs. 8 and 9 I have illustrated another modification of the construction shown in Figs. 1 to 3. In this instance the dome, instead of being formed separately, is formed by the walls of the stove structure. This dome is indicated at 23ª and has restricted outlet openings 50 disposed just above the lower edge of a transverse baffle member 22ª, and preferably in opposite side walls. The baffle member is in the form of a centrally apertured transverse partition interposed in the path of the gases rising from the primary combustion chamber and operative to reflect heat downwardly therein. Said partition has four inclined side portions 51 and 52 terminating in a central opening 24ª above the plane of the openings 50. While the front and rear portions 51 extend rather sharply upward and inward, the relatively larger end portions 52 are inclined gradually upward in overlying relation to the burner 14', the central opening 24ª being relatively narrow. The burner 14' is in this instance more elongated in form, with the front and rear legs spaced a short distance apart centrally of the compartment. Moreover the cooking and heat reflector plate 18ª is in the form of a solid plate removable forwardly from the compartment. The operation is in all respects substantially like that of Figs. 1 to 3 except that the waste gases discharge through the openings 50 directly from the upper portion of the broiler compartment into the room. A limited supply of secondary air is admitted through openings 53 formed in the side walls below the plane of the burner.

While I have herein shown and particularly described a burner mechanism of preferred character for attaining the objects of my invention, with some variations in the character of the baffle structure, it should be understood that my invention is susceptible of embodiment in other forms which may differ widely within the spirit and scope of the invention as defined by the appended claims. Essentially it consists, in its broader aspects, in a novel control of the gaseous products in their passage through the enclosure, rather than in the particular means which may be employed to effect such control.

This application includes the oxidizing dome and outlet openings therefrom which was the subject matter of my application Serial No. 561,458, filed September 5, 1931, which became abandoned February 2, 1935; and it is a continuation in part of my pending applications Serial No. 676,795, filed June 21, 1933 and No. 714,618 filed March 8, 1934. No claim is herein made to the specific structure shown in Figs. 1 to 7, insofar as such structure concerns an upper retarding chamber or dome in combination with a horizontal partition member disposed in the plane of the burner, nor to the additional central baffle member 45 as in Figs. 4 to 7, the former being claimed in my said application Serial No. 417,618, and the latter in my co-pending application Serial No. 58,463 filed January 10, 1936.

I claim as my invention:

1. In a gaseous fuel cook stove, a closed lower combustion chamber having upright side walls and a top wall, an outlet in said top wall spaced inwardly from opposite side walls, a food support in said chamber arranged generally horizontally in downwardly spaced relation to said top wall, an inlet for admitting secondary air to said chamber, a burner overlying said food support and adapted to apply heat downwardly toward the support, an upper combustion chamber communicating downwardly with the lower chamber through said outlet and having a top plate disposed horizontally a short distance above said outlet from the lower chamber, and an outlet from said upper chamber disposed laterally of the outlet from the lower chamber, one of said outlets being of restricted capacity to effect the retention in said lower chamber of a slowly rising body of highly heated gases radiating heat downwardly toward said food support.

2. In a gaseous fuel cook stove, a lower combustion chamber having four upright side walls, a baffle having outer edges fitting tightly against said side walls and inner edges defining an upper outlet substantially centrally of the chamber, said baffle closing the top of said chamber transversely thereof except for said outlet, a generally horizontal burner spaced inwardly from opposite side walls and adapted to direct flames laterally in opposite directions beneath said baffle, a food support below the burner, an inlet for admitting secondary air to said lower chamber, an upper combustion chamber having a transverse top plate spaced a short distance above said baffle so as to be impinged upon by the highly heated gases escaping through said outlet, and an outlet from said upper chamber disposed laterally of said central outlet, at least one of said outlets being of restricted capacity and cooperating with said top plate to cause the slow passage of the gases through said chambers and effect the complete consumption of the food vapors or odors before escaping from said upper chamber.

3. In a gaseous fuel cook stove, a primary combustion chamber having upright side walls, baffle means extending inwardly from opposite side walls and defining an upper opening spaced inwardly from said side walls, a food support arranged generally horizontally in said chamber below said baffle means, an inlet for admitting secondary air to said chamber, a burner for applying heat downwardly toward said support, a transversely disposed member spaced a short distance above said opening so as to be impinged upon by the highly heated gases escaping from the primary combustion chamber through the opening, said member coacting with said baffle means to define on each side of said opening a secondary combustion space, and outlets from said spaces having a restricted capacity adapted to retard substantially the rate of flow of the gases through said chamber and effect the complete consumption of food vapors before escaping from said outlets.

4. In a gaseous fuel cook stove, a walled enclosure having a broiling chamber with upright side walls, a solid plate substantially closing the chamber transversely thereof and constituting a food support, an inlet for admitting secondary air to the chamber, a burner extending horizontally approximately centrally of the chamber between opposite side walls thereof and adapted to apply heat downwardly toward the plate, a baffle extending inwardly from opposite side walls and disposed in the path of rising products of combustion and food vapors to direct the same inwardly and upwardly, and means coacting with said baffle to cause the slow escape of the gases from the chamber and effect the accumulation therein of a slowly rising body of highly heated gases radiating heat downwardly toward the plate whereby meat products on the plate may be cooked rapidly and substantially uniformly without turning the same.

5. In a gaseous fuel cook stove, a broiler chamber having a top wall with a central outlet opening therein and upright side walls, a generally horizontal food support in said chamber spaced below said top wall, an inlet for admitting secondary air to the broiler chamber, a burner for applying heat downwardly toward said food support, an upper chamber having upright side walls and a metallic top wall spaced a short distance above said central outlet opening so as to be impinged upon by the highly heated gases escaping from the lower combustion chamber through said opening, and outlet openings in opposite side walls of said upper chamber disposed below the level of the top wall thereof and operative to retard substantially the rate of flow of the gases through the lower and upper chambers successively.

6. In a gaseous fuel stove, a lower combustion chamber having four upright side walls, a baffle having an outer edge fitting tightly against said side walls and projecting inwardly and upwardly from said side walls to define an upper outlet opening substantially centrally of the chamber, said baffle closing the top of said chamber transversely thereof except for said opening, a generally horizontal burner member spaced inwardly from said side walls and adapted to direct flames laterally in opposite directions beneath said baffle, an inlet for admitting secondary air to said lower chamber, and an upper combustion chamber having a metallic top plate spaced a short distance above said top wall of the lower chamber so as to be impinged upon by the highly heated gases escaping through said outlet opening, said upper chamber having outlet openings at opposite sides of said central opening below the level of the top plate and adjacent the outer opposite edges of said baffle.

7. In a gaseous fuel stove, a lower combustion chamber having upright side walls, an upper combustion chamber having upright side walls and a top wall, a burner arranged generally horizontally in inwardly spaced relation to opposite side walls of said lower chamber, a horizontal plate spaced a short distance below said burner, an inlet for admitting secondary air to said lower chamber, outlet openings disposed at opposite sides of the upper chamber below the level of the top wall thereof, and baffle means extending inwardly from opposite side walls of the lower chamber below the level of said outlet openings and defining a central opening disposed in a plane a short distance below said top wall and above the level of said outlet openings, said burner being adapted to direct flames laterally in opposite directions beneath said baffle and said central opening therein, said baffle serving to direct the hot gases incident to combustion inwardly and upwardly through said central opening into said upper chamber, and said top wall of the upper chamber serving to deflect the gases outwardly for passage laterally and downward to said outlet openings.

8. In a cook stove, a broiling chamber having upright side walls, a generally horizontal food support in said chamber, a burner spaced a short distance above said support for applying heat downwardly toward the support, and a baffle structure comprising a plurality of transverse members spaced a short distance apart vertically to form between them a laterally extending space, the lower one of said members defining a top wall for the broiling chamber, said structure defining an outlet from the chamber into said space and an outlet from the space disposed laterally away from and below the level of the outlet from the chamber, and said space and outlets forming a passageway constructed and proportioned to retard substantially the rate of discharge of the gases from the chamber and temporarily confine such gases at a temperature sufficient to effect the consumption of unburned food vapors before discharging from said space.

CLAUDE E. PARKER.